United States Patent [19]
Khelifa et al.

[11] Patent Number: 5,335,719
[45] Date of Patent: Aug. 9, 1994

[54] APPARATUS FOR HEATING AND/OR COOLING A COMPARTMENT

[75] Inventors: Noureddine Khelifa, Stuttgart; Roland Burk, Kornwestheim, both of Fed. Rep. of Germany

[73] Assignee: Behr GmbH & Co., Stuttgart, Fed. Rep. of Germany

[21] Appl. No.: 958,098

[22] Filed: Oct. 7, 1992

[30] Foreign Application Priority Data

Oct. 12, 1991 [DE] Fed. Rep. of Germany ....... 4133917

[51] Int. Cl.$^5$ .............................................. B60H 3/00
[52] U.S. Cl. ........................................ 165/42; 62/239; 62/271; 165/60
[58] Field of Search ............... 62/271, 467, 476, 238.3, 62/94, 239; 34/80; 237/2 B, 12.3 A, 12.3 B; 165/58, 60, 42, 62

[56] References Cited

U.S. PATENT DOCUMENTS 2,075,036 3/1937 Hollis ............................ 62/271 X
4,570,360 2/1986 Nakagomi ........................ 34/80

Primary Examiner—Henry A. Bennet
Attorney, Agent, or Firm—Foley & Lardner

[57] ABSTRACT

An apparatus for heating and/or cooling a cab, for example a motor vehicle passenger compartment, communicating with a supply duct for supplying air to the compartment and an exhaust air duct for exhausting air from the compartment. The apparatus includes at least two sorbent reactors provided with a sorbent such as zeolite or the like, each reactor having a reaction chamber. First and second air streams alternately flow through each of the reaction chambers such that while the first air stream is flowing through the first reactor and undergoing adsorption in the selected reaction chamber, the second air stream is simultaneously flowing through the other reactor where desorption takes place, thereby allowing for continuous heating or cooling of the cab.

23 Claims, 11 Drawing Sheets

APPARATUS FOR HEATING AND/OR COOLING A COMPARTMENT

BACKGROUND OF THE INVENTION

1. Field of the Invention

The invention relates to an apparatus for heating and/or cooling a compartment, in particular a passenger compartment in a motor vehicle, in such a way that the heating and/or cooling is possible continuously over an extended period of time.

2. Background Information

Patent application Ser. No. 07/851,655, filed Mar. 16, 1992, and incorporated by reference herein, discloses an apparatus of the same generic type as the present invention. That application discloses an apparatus and method in which satisfactory air-conditioning of the passenger compartment in a motor vehicle is accomplished without the use of CFC coolants. However, the problem with this earlier device is that following an air-conditioning adsorption phase serving for air, the charged reactor has to be desorbed, and during the desorption of the reactor, sufficient refrigerating energy is not available. Thus, with an adsorption reactor of this type, the air-conditioning or heating of a compartment is possible for only a limited period of time.

SUMMARY OF THE INVENTION

The object of the present invention is therefore to further develop an apparatus of the above-noted generic type in such a way that heating and/or cooling of a compartment is possible continuously over an extended period of time.

This object is achieved by adding to the generic device an arrangement of a second sorption reactor which makes continuous operation of the apparatus possible. In the adsorption phase of the first reactor, refrigerating energy is made available for a first operating cycle, and at the same time the second reactor is desorbed. When the first sorption reactor reaches its charging limit, a changeover is made to the second reactor, by now desorbed, so that sufficient refrigerating energy becomes available for air-conditioning the compartment for a subsequent operating cycle. In the adsorption phase of the second reactor, the first reactor is then desorbed, in order to be available for a next operating cycle. Continuous air-conditioning of the compartment is therefore possible. Like desorption, adsorption takes place pressurelessly, which ensures a simple construction of the apparatus.

More specifically, in the illustrated embodiment, apparatus is structured such that at least two sorption reactors are provided with a sorbent such as zeolite or the like, each of the reactors having a reaction chamber with opposing ends. The first duct is positioned at one end of each of the reaction chambers, through which first duct a first air stream passes from the exhaust air duct into a selected one of the reaction chambers for adsorbing moisture onto the sorbent and adding adsorption heat to the first air stream, and through which first duct a second air stream flows out of the selected other one of the reaction chambers. The second duct is positioned at the opposite end of each of the reaction chambers through which second duct the second air stream passes into the selected other one of the reaction chambers for desorbing the moisture from the sorbent, and through which second duct the first air stream flows out of said selected one of said reaction chambers. Thus, the first and second air streams alternately flow through each of the reaction chambers, such that while the first air stream is flowing through the selected one of the reactors and being fed via the supply air duct and a humidifying source into the compartment, the second air stream is simultaneously flowing through the selected other one of the reactors and desorbing the moisture from the sorbent.

Each of the first ducts may further include means for selectively controlling and guiding the first air stream from the exhaust air duct, through the selected one or the other of the first ducts and into the selected one or the other of said reaction chambers, and each of the second ducts may include means for selectively controlling and guiding the second air stream from an air conducting duct, through the selected one or the other of said second ducts and into the selected one or the other of said reaction chambers.

As noted above in the first illustrative embodiment, the interchanging of the reactors is performed via air-conducting ducts fixed to the housing and corresponding air-stream control elements. Such air-stream control elements, which are designed in particular as air flaps, are of simple construction. This allows for rapid switching over, whereby direct switching over from one reactor to the other reactor is ensured.

In order to ensure almost complete desorption of a charged reactor within a short period of time, an internal heat exchanger is arranged in the reaction chamber, and is connected on the primary side to an external heat exchanger. Exhaust gas from the internal combustion engine impinges upon the external heat exchanger. Due to the thermal energy produced, the water taken up in the sorbent evaporates and is taken away by an air stream which is fed-in via an air vent duct.

Apart from the external heat exchanger being impinged with exhaust gas, there is preferably a second heat exchanger arranged in parallel to the external heat exchanger. The second heat exchanger is impinged with cooling air and is operated in connection with the internal heat exchanger of the reaction chamber, which is in the adsorption phase.

In a preferred further embodiment of the invention, the reactors form a drum-shaped rotor, the reaction chambers being aligned in the axial direction of the rotor and closed at both axial ends of the rotor by end plates which are fixed to the housing and have inflow and outflow openings. These openings extend over a partial circumference of the end face of the rotor, for the first and the second air stream. The reaction chambers consequently form a flow connection between the inflow opening in the one end plate and the outflow opening in the other end plate. Thus, by turning the rotor, a reactor capable of adsorption can in each case be connected between the exhaust air duct and the supply air duct, while the charged reactor is desorbed in the other flow connection. The advantage of this embodiment is that a multiplicity of air-stream control elements is not required for switching over the air streams.

In the rotor arrangement of the present invention there is advantageously arranged a multiplicity of reactors, with the reaction chambers adjoining one another in the circumferential direction of the rotor without any clearance. If the rotor is operated rotating at constant speed, it is also possible to dispense with open-loop and closed-loop control devices, which are otherwise necessary for switching the air-stream control elements or for switching over the rotor step by step.

Another object of the present invention is having an inflow opening and an outflow opening arranged in each end plate of the rotor, thereby providing for a flow reversal between the adsorption phase and desorption phase, which is advantageous for the desorption.

Further features of the invention will be apparent from the description and the drawings, in which illustrative embodiments of the invention are described and diagrammed.

DETAILED DESCRIPTION OF THE PREFERRED EMBODIMENTS

Figure 1A:
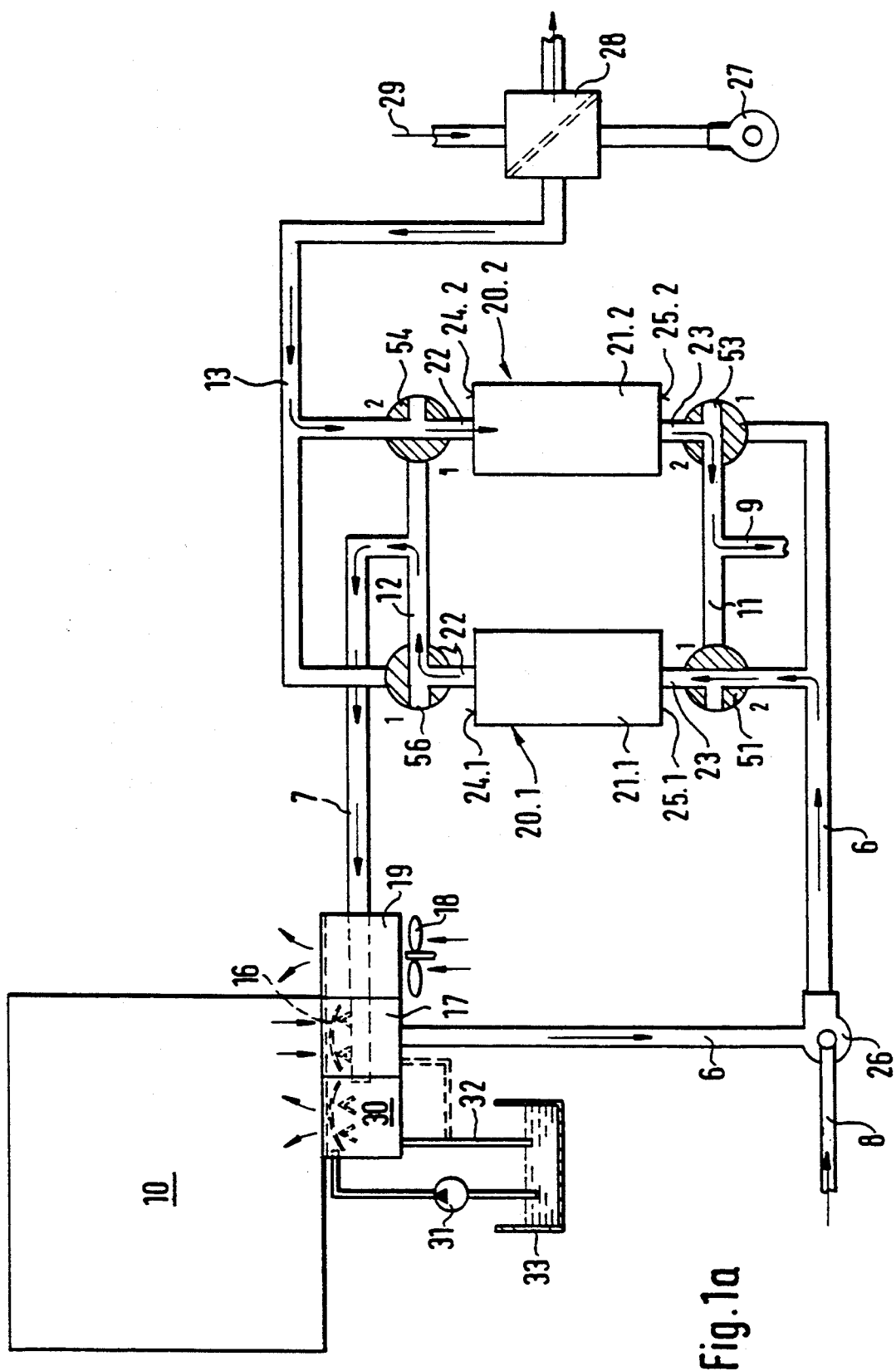
FIG. 1a shows diagrammatically an apparatus according to the invention for cooling a compartment with two sorption reactors.
Figure 1B:
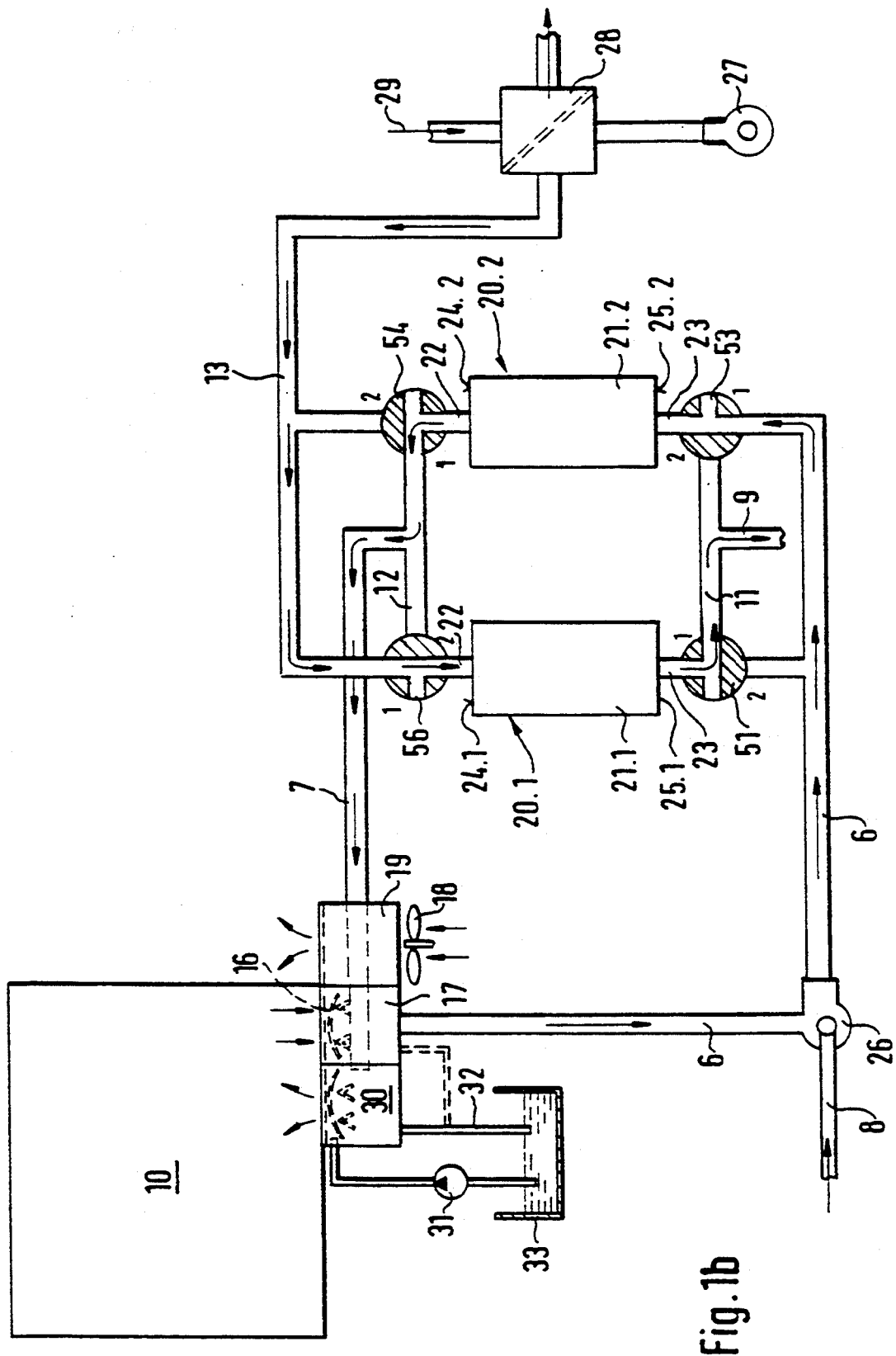
FIG. 1b shows the diagram according to FIG. 1a with switched-over reactors.

Diagrammatically shown in FIGS. 1a and 1b is an apparatus for cooling a cab 10, for example, the passenger compartment of a motor vehicle. The cab 10 has an exhaust air duct 6 and a supply air duct 7, by which the compartment can be air-conditioned.

The apparatus has two sorption reactors 20.1 and 20.2 which include, among other components, a reaction chamber 21.1 and 21.2, respectively, filled with a sorbent such as zeolite or the like. The reactors 20.1 and 20.2 are preferably identical. The reaction chamber compartments each have opposing ends 24.1 and 25.1 or 24.2 and 25.2, respectively.

At each end of the compartments 24.1, 24.2 and 25.1, 25.2, there is provided a duct 22 or 23 for guiding an air stream through the reaction chamber 21.1 or 21.2.

The ducts 23 of the reaction chambers 21.1 and 21.2 are connected to one another via a cross-duct 11. The ducts 22 at the other ends 24.1 or 24.2 of the reaction chambers 21.1 or 21.2, are connected to one another via a cross-duct 12. At the connection points of the cross-duct 11, 12 on the respective ducts 22, 23 there are arranged in each case air-stream control elements 51, 53, 54 and 56, which in the illustrative embodiments shown are designed as flaps. Connected to the cross-duct 11 is a vent air duct 9; connected to the cross-duct 12 is the supply air duct 7.

The ducts 23 of the sorption reactors 20.1 and 20.2 are connected via the air-stream control elements 51 and 53 to the exhaust air duct 6, which draws off exhaust air from the interior of the cab by means of a blower 26 and feeds it to one or the other duct 23. A fresh air duct 8 opens out in the area of the blower 26, in order to mix in fresh air with the exhaust air in a metered manner via an air-stream control element (not shown).

The ducts 22 of the sorption reactors 20.1 and 20.2 are connected via the air-stream control elements 54 and 56 to an air-conducting duct 13, which guides an air stream delivered by a blower 27. The blower 27 delivers ambient air in particular. In the illustrative embodiment of FIGS. 1a and 1b, the air-conducting duct 13 contains a heat exchanger 28, into which exhaust gas 29 is fed for heating up the air stream guided in the air-conducting duct 13. The exhaust heat of a drive motor (not shown) serves as drive energy for the apparatus. If no exhaust gas is available, or it is not available in sufficient quantity or at a sufficient temperature level, the amount of heat necessary for desorption must be provided in some other way, for example by means of a burner. The exhaust heat of any other units, such as components of the drive unit of the electrical vehicle, may also serve as a heat source for heating up the air stream.

In the "1" position of the air-stream control elements 51, 53, 54 and 56, the flow pattern represented in FIG. 1a is obtained. In the first position, the blower 26 extracts interior compartment air via the exhaust air duct 6 and delivers the exhaust air—if needed, to be prepared with fresh air-via the ducts 23 to the sorption reactor 20.1. The moisture of the interior compartment's air is adiabatically adsorbed in the reaction chamber 21.1 by the sorbent, with the corresponding adsorption heat being taken up by the air stream. The dry, hot air stream leaves the reaction chamber 21.1 via the duct 22 and flows via the cross-duct 12 into the supply air duct 7, in order to enter the cab 10 via a humidifying source such as evaporator 30. In the adiabatic evaporator 30, the air is cooled to the cooling limit and thus serves for air-conditioning.

As shown in FIG. 1(a), a heat exchanger 19 is arranged in the supply air duct 7, through which a cooling air stream is made to flow by means of a fan 18. The supply air is thus cooled before entry into the evaporator 30, in order to achieve as low a temperature level as possible.

The supply air is advantageously guided in crossflow with respect to the exhaust air through another separate heat exchanger 17. Heat exchanger 17 is positioned between the heat exchanger 19 and evaporator 30. In heat exchanger 17, heat is transferred from the supply air to the exhaust air. By adding an additional evaporator 16 to the arrangement of heat exchanger 17, the exhaust air is preferably moistened to saturation by the supply air during the course of heating, thereby achieving a lower cooling temperature. The evaporators 16 and 30 are supplied with excess liquid, preferably water, flowing off into the storage tank 33 via a return-flow nozzle 32 from a common feed pump 31.

While the sorption reactor 20.1 supplies the necessary cooling energy for air-conditioning the compartment, the sorption reactor 20.2 is impinged by a second air stream, which is heated up by the hot exhaust gas 29 and is fed via the air-stream control element 54 to the duct 22 at the end 24.2 of the reaction chamber 21.2. The hot air stream drives out the moisture contained in the sorbent and carries it away via the duct 23, and the airstream control element 53 via the vent air duct 9, thereby allowing adiabatic desorption to take place.

Once the sorption reactor 20.1 has reached its charging limit, all the air-stream control elements 51 through 56 are switched over to the position "2", as is represented in FIG. 1b. From now on, duct 23 of the sorption reactor 20.2 is connected to the exhaust air duct 6, and the supply air duct 7 is connected to its outflow duct 22. A hot air stream now flows through and is desorbed in the sorption reactor 20.1. At the same time, during desorption, the second air stream flows through the reaction chamber 21.1 in the opposite direction of the first air stream of the adsorption phase.

The two sorption reactors 20.1 and 20.2 thus alternately supply, during their adsorption phase, the cooling energy necessary for air-conditioning the cab 10. After a predetermined time interval in each case, a switch-over of all the air-stream control elements 51, 53, 54 and 56 from the position "1" to "2", and vice versa, takes place, and the reactors are switched alternately from adsorption to desorption, and vice versa.

Because of the continuous overall switching of the air-stream control elements 51, 53, 54 and 56, it is also advantageous to monitor the temperature in supply air duct 7. In this scenario, the switching-over of the reactors is performed after the temperature of the supply air stream drops below a predeterminable minimum temperature. It may also be expedient to monitor the moisture in the adsorbing reaction chamber and to perform the switching-over based on this moisture level.

In the following illustrative embodiments of FIGS. 2a to 9, the same reference numerals are used to label identical parts previously illustrated in FIGS. 1a and 1b.

Figure 2A:
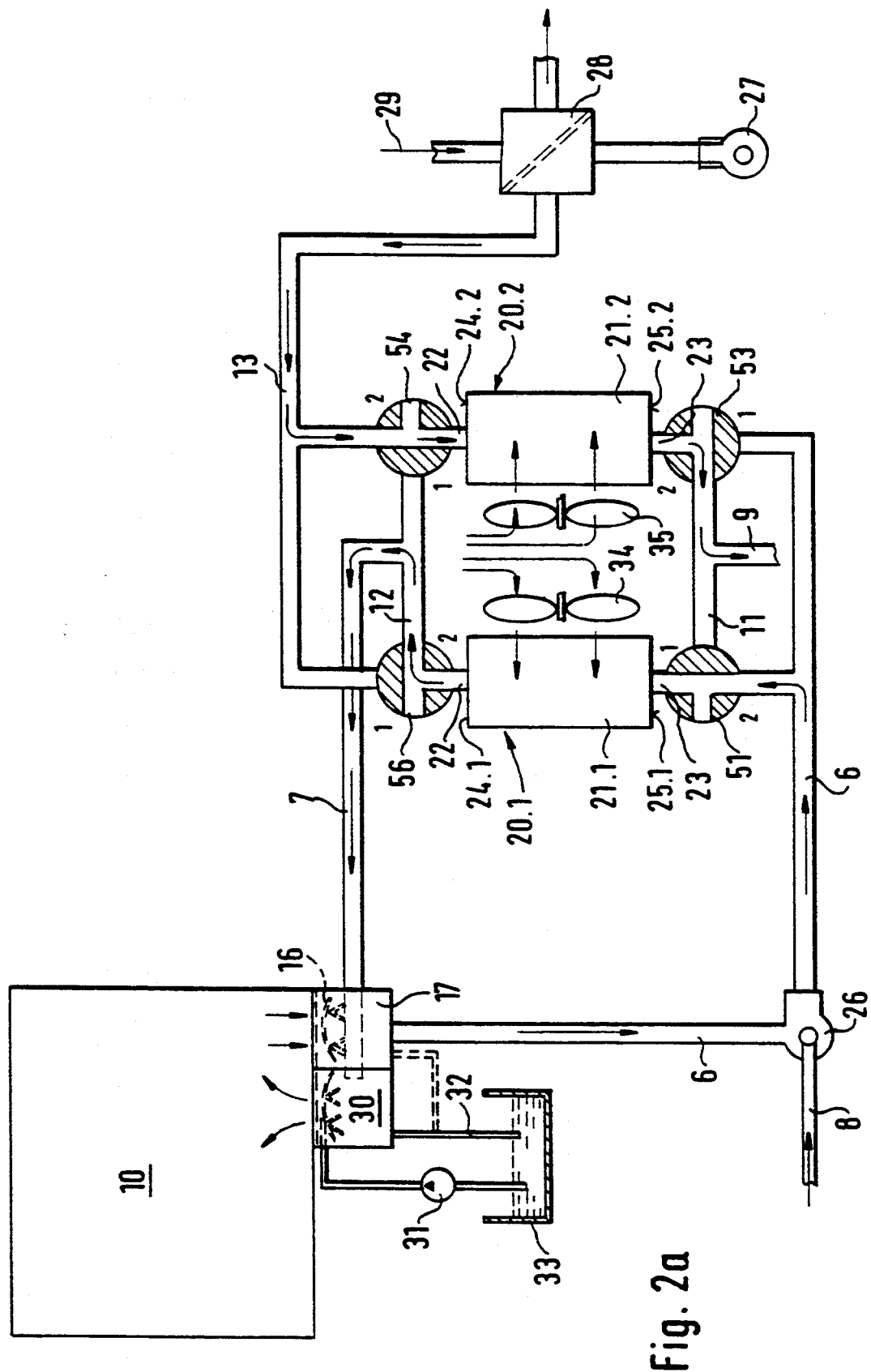
FIG. 2a shows the diagrammed apparatus according to FIG. 1a with cooling-air fans assigned to the sorption reactors.
Figure 2B:
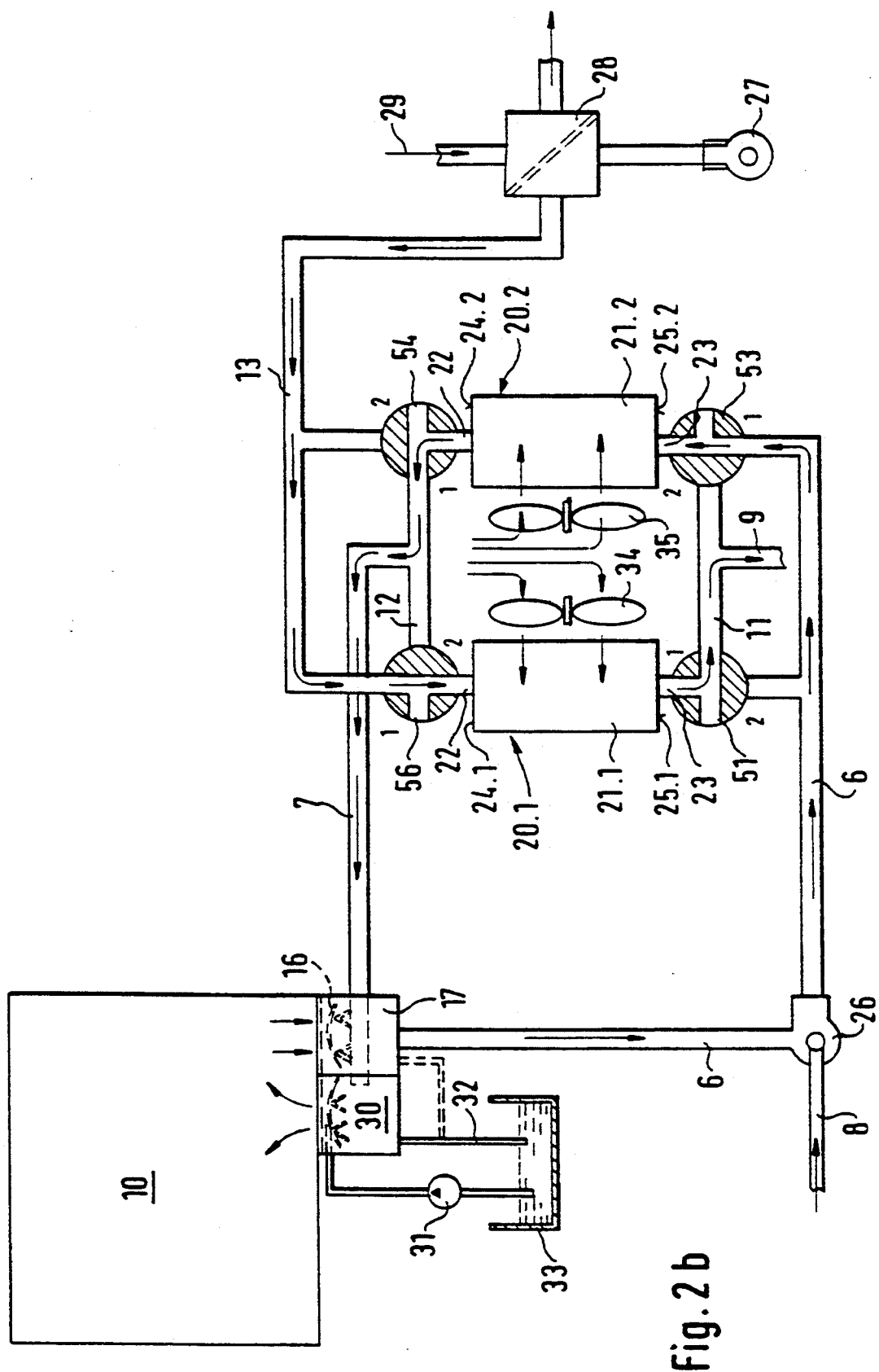
FIG. 2b shows the diagrammed apparatus according to FIG. 2a with switched-over reactors.

In the illustrative embodiment according to FIGS. 2a and 2b, the sorption reactors 20.1 and 20.2 are assigned cooling air fans 34 and 35. The cooling air stream of fans 34 and 35 cools the respective reactor 20.1 or 20.2. In this case, the cooling air fan of the reactor running in the adsorption phase is permanently in operation, whereby an isothermal adsorption is achieved upon reduction of the H$_2$O partial pressure. Therefore, as shown by the solid flow arrows in FIG. 2a, the cooling air fan 34 is permanently in operation in the adsorption phase of the reactor 20.1, and in FIG. 2b the cooling air fan 35 is permanently in operation in the adsorption phase of the reactor 20.2. As shown in FIGS. 2a and 2b, this arrangement eliminates the need for heat exchanger 19 and its cooling air fan 18, formerly illustrated in the embodiments of FIGS. 1a and 1b.

Similar to the diagrams of FIGS. 1a and 1b, the adiabatic desorption of the charged reactor 20.1 or 20.2 takes place by means of a heated air stream, for which reason the sorbent is heated up correspondingly at the end of the desorption phase. Thus, at the end of a desorption phase of a reactor, the cooling air fan 34,35 assigned to the particular reactor 20.1, 20.2 is advantageously put into operation, in order to achieve a temperature reduction of the sorbent before commencement of the adsorption phase. As seen in FIG. 2a, the cooling air fan 35 is put into operation before switching over the reactors, and, in FIG. 2b, the cooling air fan 34 is put into operation before switching over the reactors. This is diagrammed in FIGS. 2a and 2b by dashed airflow arrows.

Figure 3A:
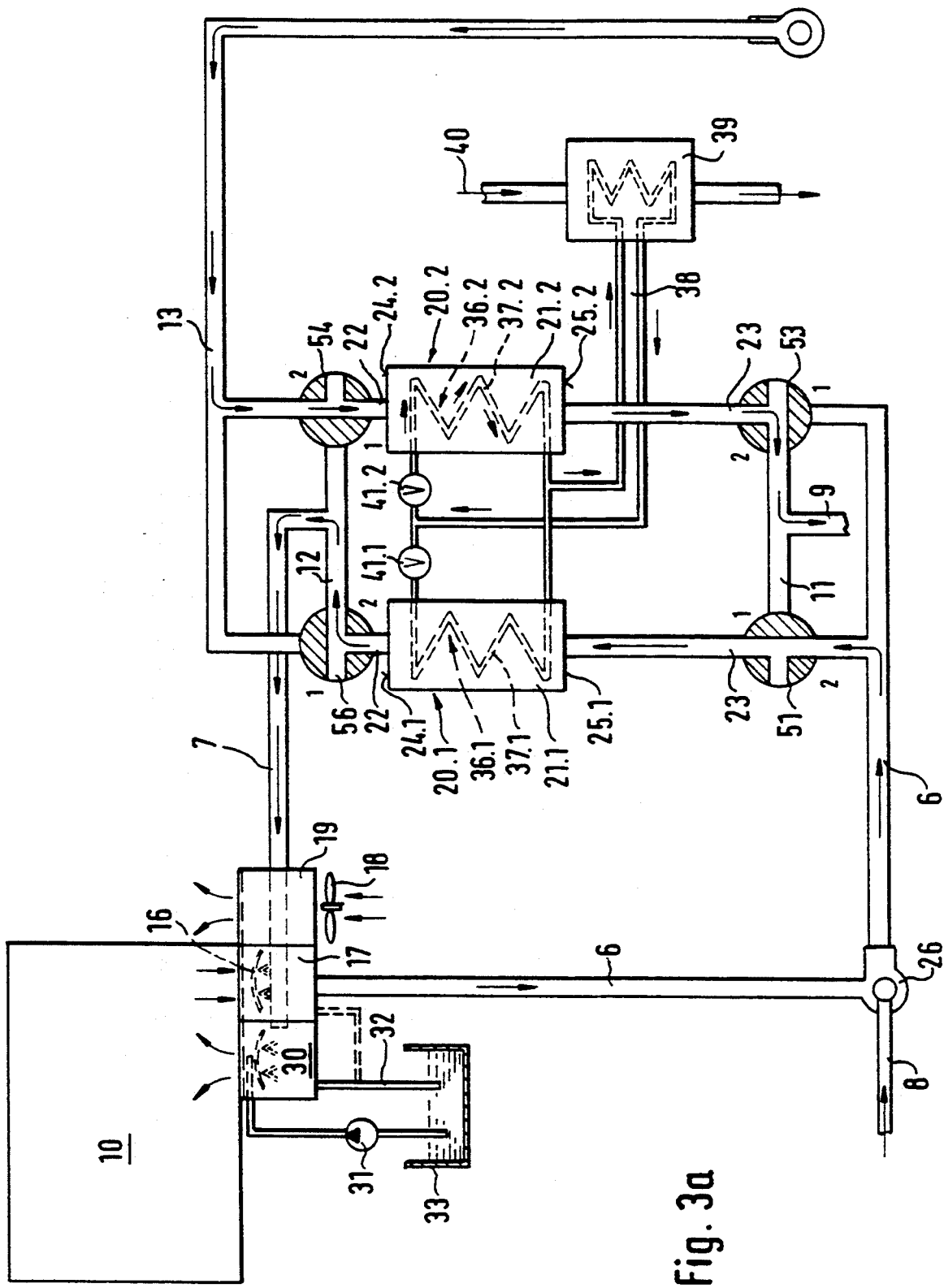
FIG. 3a shows diagrammatically an apparatus for cooling a compartment with two sorption reactors and internal heat exchangers arranged in the reactors as well as a common external heat exchanger.
Figure 3B:
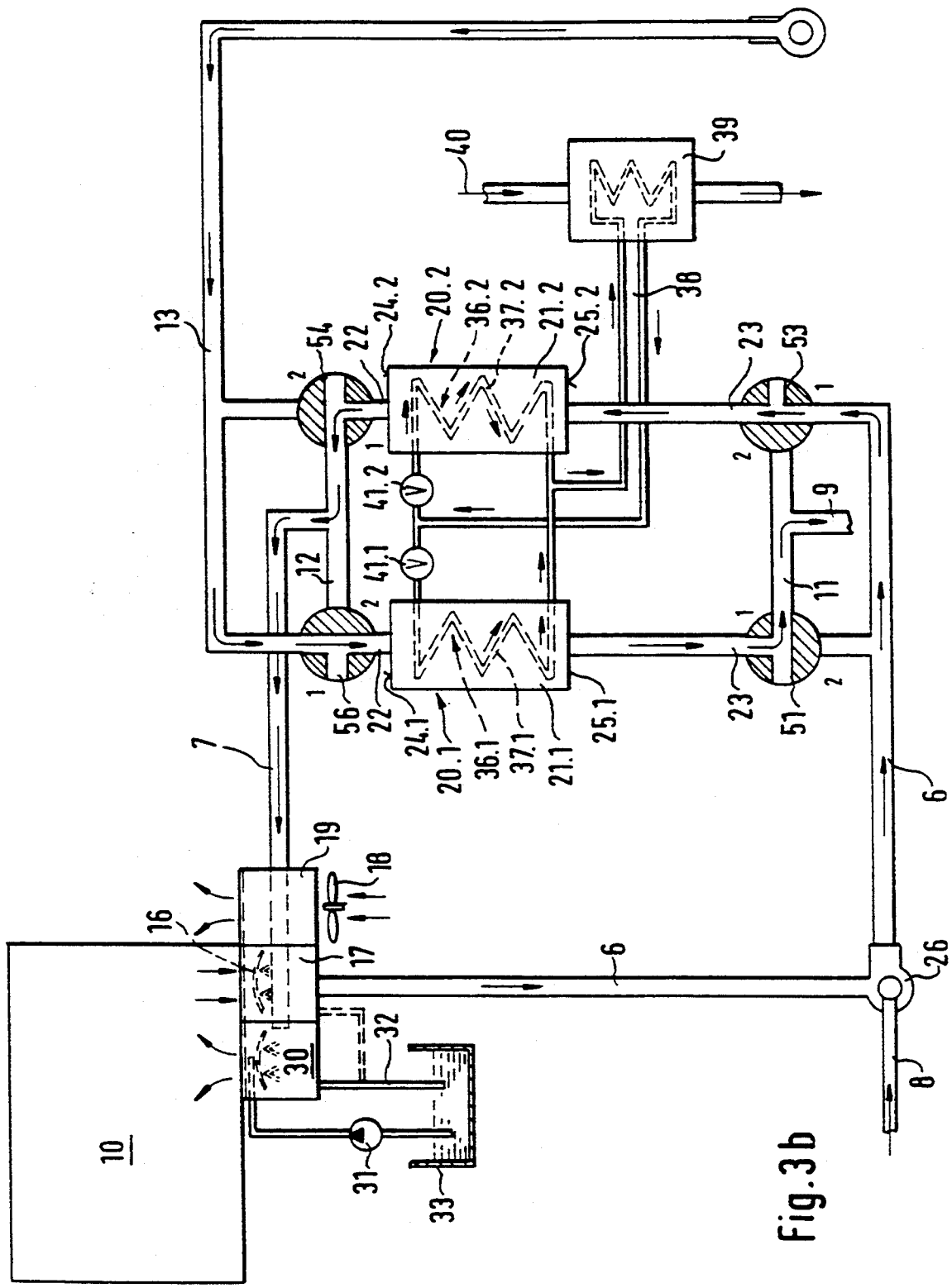
FIG. 3b shows the diagrammed apparatus according to FIG. 3a with switched-over reactors.

In the illustrative embodiment according to FIGS. 3a and 3b, in each reaction chamber 21.1 and 21.2 there is arranged an internal heat exchanger 36.1 and 36.2, respectively, which is embedded in the sorbent. Tube coils 37.1, 37.2 or the like embedded in the sorbent are advantageously used as heat exchangers. The primary sides of the heat exchangers 36.1 and 36.2, formed by the tube coils 37.1 and 37.2, are connected in parallel. Also connected in parallel with the primary sides of the heat exchanger is the primary side 38 of an external heat exchanger 39, which is impinged by the heated air stream 40. In particular, the source of this heated air stream may be the exhaust gas of the motor vehicle. The primary sides 37.1 and 37.2 of the heat exchangers 36.1 and 36.2 can be separated from the primary side 38 of the external heat exchanger by means of valves 41.1 and 41.2. With this arrangement the heat exchangers 36.1, 36.2 corresponding to reactors 20.1, 20.2 are put into operation only one at a time, therefore allowing for the isothermal desorption of the particular reactor. The reactor in the desorption phase is, furthermore, as already described with respect to the illustrative embodiments FIGS. 1 and 2, impinged via the air-conducting duct 13 by an air stream which is generated by a blower 27 and carries away the evaporated water via the vent air duct 9.

For example, in FIG. 3a, the sorption reactor 20.2 is isothermally desorbed by heating up the reactor by means of the heat exchanger 36.2 and guiding through the heat exchanger an air stream fed in via the air-conducting duct 13, while in FIG. 3b the heat exchanger 36.1 heats up the zeolite in the reactor 20.1 and the evaporated moisture from the air stream fed in via the air-conducting duct 13 is carried away. In this illustrative embodiment as well, the desorption takes place in the opposite flow direction of the adsorption.

In the illustrative embodiment according to FIGS. 3a and 3b, in order to achieve sufficient cooling of the supply air stream heated up by adiabatic adsorption, in the supply air duct 7 there is again arranged a heat exchanger 19, the operating principle of which is identical to that explained with respect to FIGS. 1a and 1b.

Figure 4A:
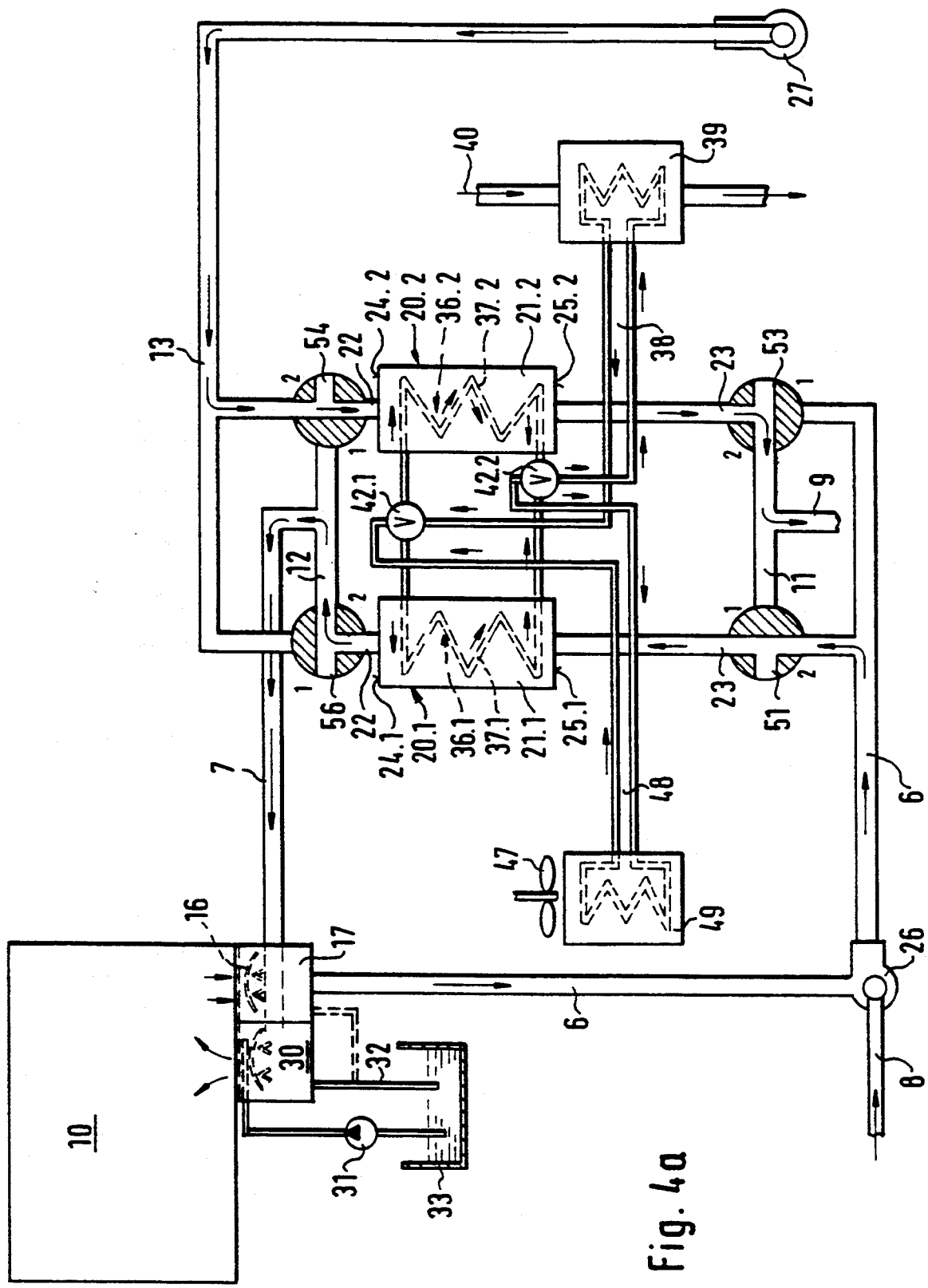
FIG. 4a shows the diagrammed apparatus according to FIG. 3a with an additional external heat exchanger.
Figure 4B:
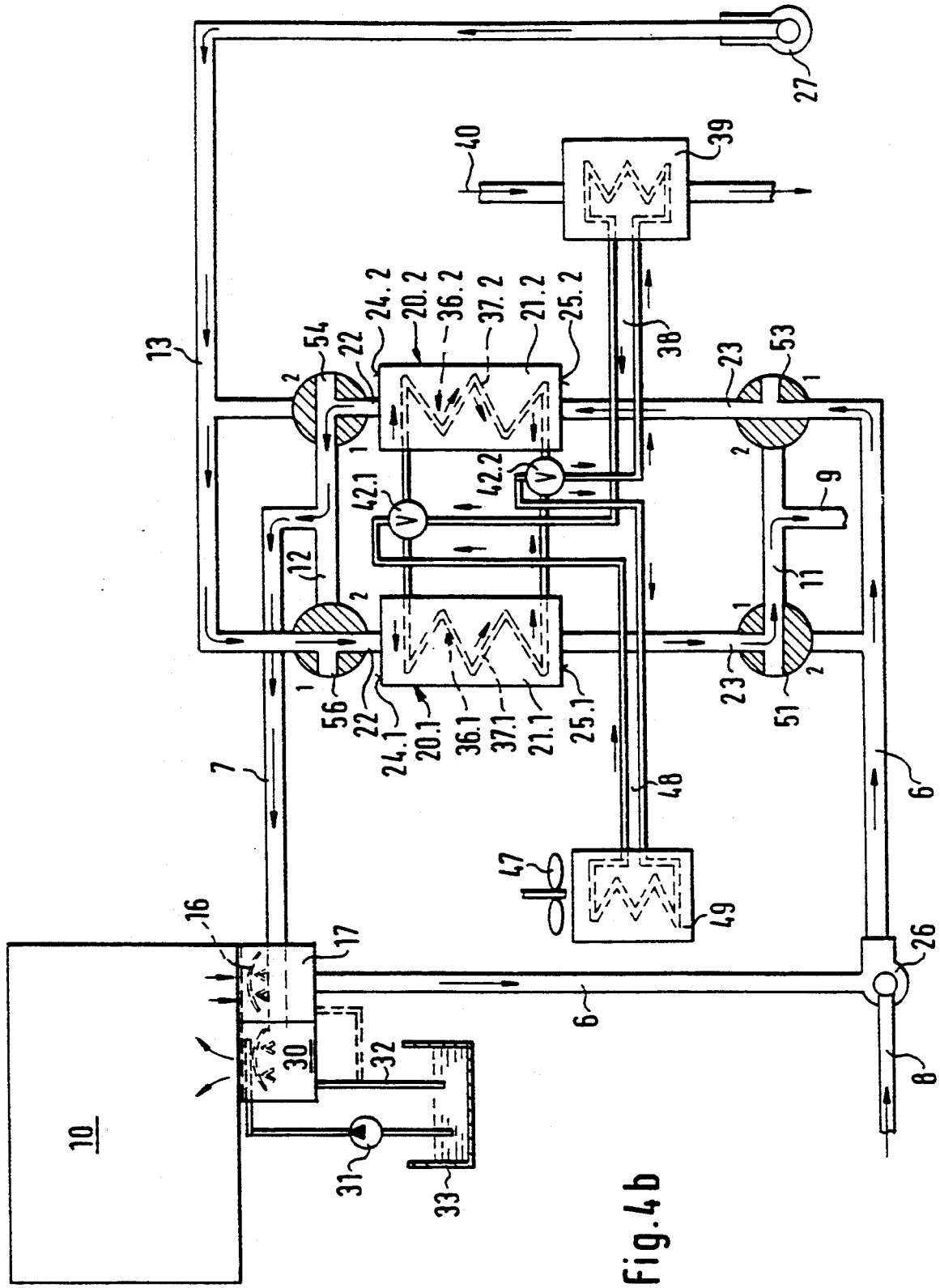
FIG. 4b shows the diagrammed apparatus according to FIG. 4a with switched-over reactors.

In the illustrative embodiment according to FIGS. 4a and 4b, there are arranged instead of the simple switching valves 41.1 and 41.2 of FIGS. 3(a) and 3(b), switching-over valves 42.1 and 42.2. By means of the switching-over valves of 42.1 and 42.2, the primary side 38 of the external heat exchanger 39 is connected in parallel with the primary sides of their corresponding internal heat exchangers 36.1 or 36.2. In addition, the primary side 48 of an additional external heat exchanger 49, which is impinged with cooling air by means of a fan 47, is cut in by means of the changeover valves 42.1 and 42.2. The heat exchangers 36.1 and 36.2 are connected on the primary side alternately to the one or the other of external heat exchanger 39 or 49. Thus, as noted previously above, the cooling of the sorbent in the one reactor makes an isothermal adsorption possible, while at the same time, the heating-up of the sorbent in the other reactor makes an isothermal desorption possible.

The switching of the changeover valves 42.1 and 42.2 preferably takes place at the same time as the over-all switching of the air-stream control elements 51, 53, 54 and 56.

It may also be expedient at the end of a desorption phase and before commencement of an adsorption to switch the heat exchanger of the desorbed reactor in parallel with the heat exchanger of the adsorbing reactor, that is to connect it to the external, cooling heat exchanger.

Figure 5:
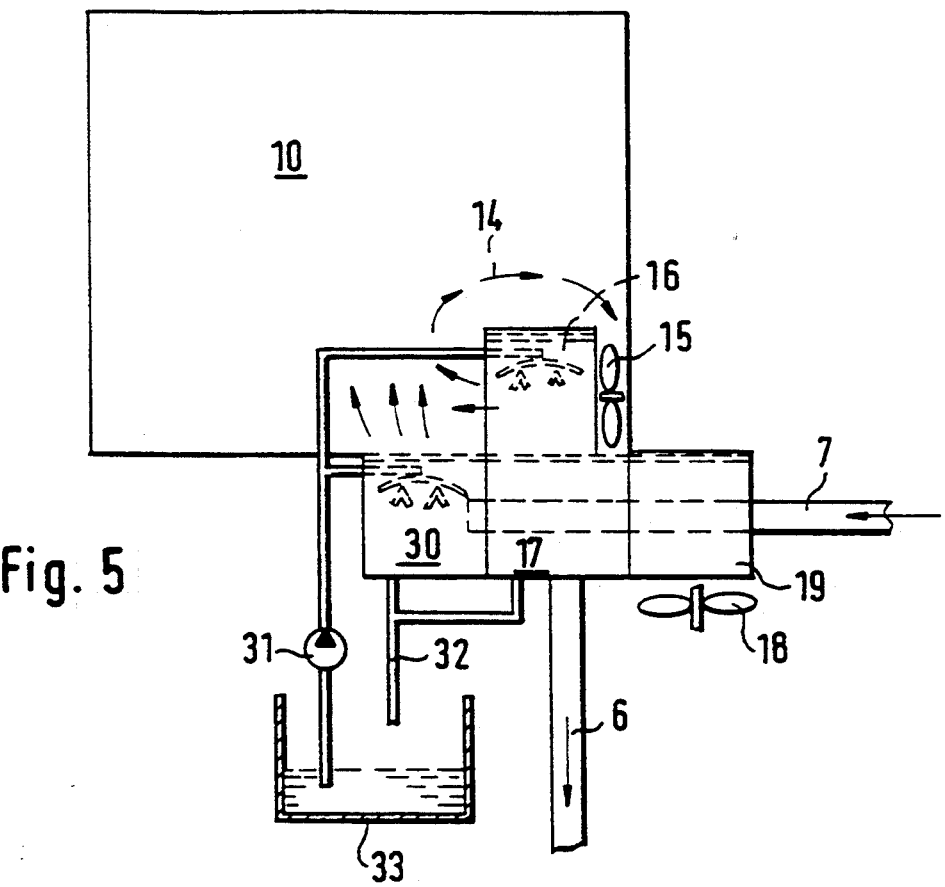
FIG. 5 shows diagrammatically a compartment arranged with an internal evaporator.

As diagrammed in FIG. 5, the evaporator 16 assigned to the exhaust air duct 6 may be arranged in the interior of the cab 10. The evaporator has a second flow path, which is bounded by heat exchanging surfaces and through which a fan 15 circulates on air stream 14. In this way, cooling of the circulating stream takes place.

Figure 6:
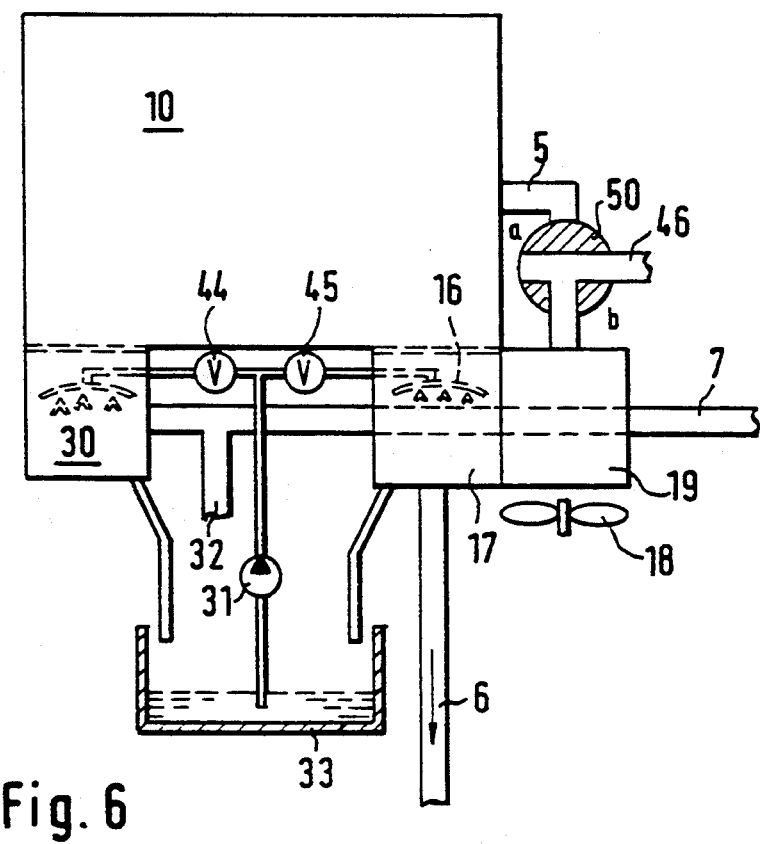
FIG. 6 shows the diagram of a compartment according to FIG. 5 with a hot air duct fed by a heat exchanger in the supply air duct.

In the illustrative embodiment according to FIG. 6, the cooling air stream of the supply air heat exchanger 19 can be fed via an air-stream control element 50 optionally to a hot air duct 5 (flap position b) to the interior of the cab 10 or is carried away via a vent air nozzle 46 (flap position a). For heating the cab 10, the dry air flowing in from the reactor may also be fed directly to the cab 10, for example, via the hot air duct 5.

FIG. 6 shows, furthermore, a favorable arrangement of the evaporators 16 and 30, which are supplied with water from the storage tank 33 by the common feed pump 31 via flow valves 44 and 45. Excess water flows back into the tank 33 via the return flow nozzle 32.

Figure 7:
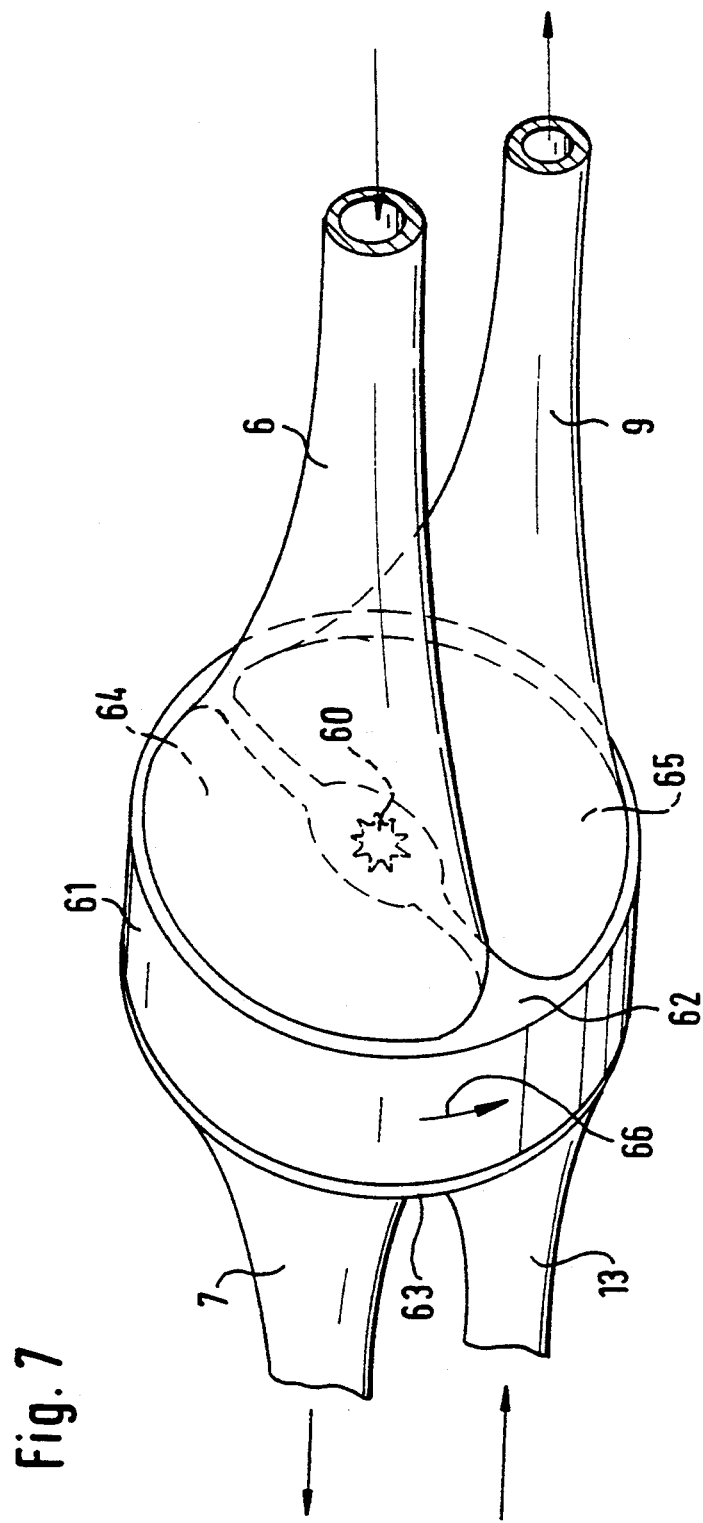
FIG. 7 shows diagrammatically a component of a rotating sorption reactor with connection ducts which are fixed to the housing.

In FIG. 7, a possible structural design of the apparatus according to the invention is represented. It comprises a rotor 61 which can be rotated about an axis 60 and in which there are arranged the reactors 20.1 and 20.2, as diagrammed in the above illustrative embodiments. The reaction chambers of the reactors 20.1 and 20.2 are aligned in the axial direction of the rotor and open at the axial ends. The reaction chambers preferably fill the entire interior of the rotor 61 and adjoin one another in the circumferential direction without any clearance. In this case, each reaction chamber has a part-annular cross section, which extends over a 180° angle at the circumference of the rotor.

The axial ends of the reaction chambers are closed by rotor end plates 62 and 63, which are fixed to the housing and in which there are arranged flow openings 64 and 65, which correspond to the ducts 22 and 23, illustrated in the embodiments of FIGS. 1 through 4. Each flow opening 64 and 65 corresponds in plan view to a partial annular surface of the cross section of a reaction chamber. The partial annular surface of the flow opening 64 or 65 is preferably congruent with the partial annular surface of a reaction chamber end face. At the same time, in the present illustrative embodiment, an inflow opening 64 and an outflow opening 65 are arranged in each end face; the inflow opening in the end plate 63 in this case lies congruently opposite the outflow opening 65 in the end plate 62, whereas the inflow opening 64 in the end plate 62 lies congruently opposite the outflow opening in the end plate 63. The reaction chamber of a sorption reactor consequently forms a substantially tight flow connection between an inflow opening in the rotor end plate 63 and an outflow opening 65 in the rotor end plate 62, and vice versa. The inflow opening 64 is adjoined by the exhaust air duct 6, the outflow opening 65 is adjoined by the vent air duct 9. Correspondingly, the supply air duct 7 is connected to the outflow opening in the end plate 63, whereas the inflow opening of the end plate 63 adjoined by the air-conducting duct 13.

In order to ensure continuous cooling operation in the case of a design with two sorption reactors, the rotor 61 may be driven rotatingly at a specifically determined speed or, after the elapse of predetermined intervals of time, suddenly turned through 180° in order to arrange the desorbed reactor as a flow connection between exhaust air duct 6 and supply air duct 7, and the charged reactor as a flow connection between air-conducting duct 13 and vent air duct 9. The design shown makes a quasi-continuous air stream between exhaust air duct 6 and supply air duct 7 possible in the case of continuous air-conditioning of a compartment, such as cab 10.

Figure 8:
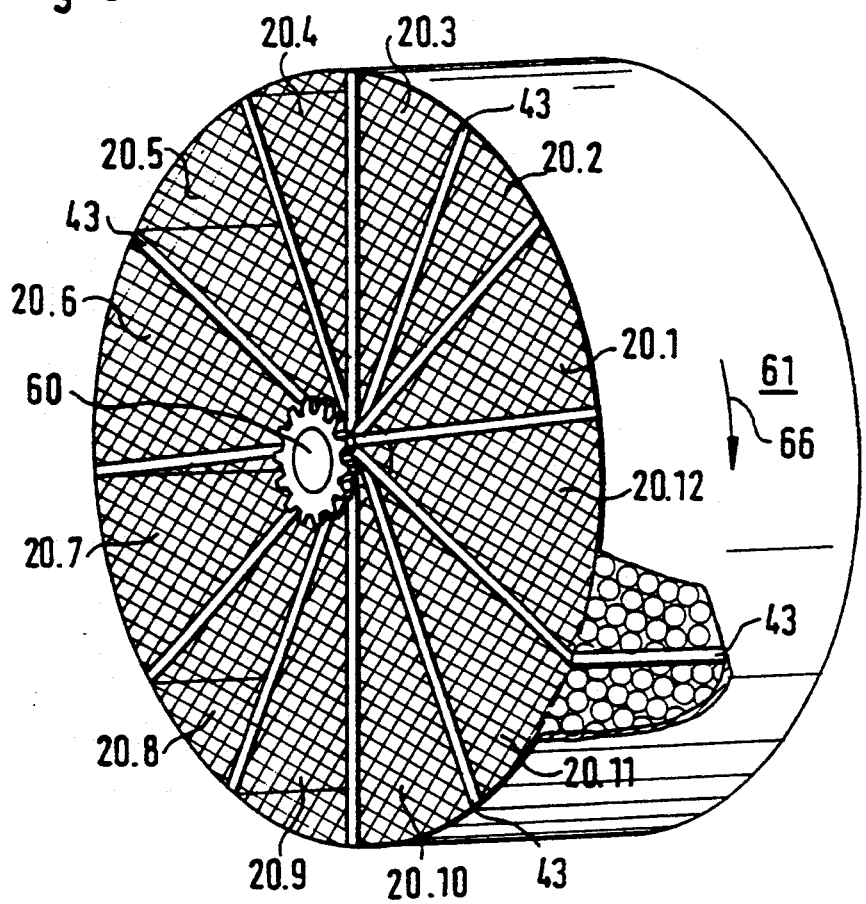
FIG. 8 shows diagrammatically an embodiment of a rotor according to FIG. 7.

In FIG. 8, a further illustrative embodiment of a rotor 61 is shown, which has a multiplicity of reaction chambers 20.1 to 20.12, which lie next to one another in the circumferential direction without any clearance and have in each case axial end faces which are approximately in the form of a sector of a circle and are jointly covered by the rotor end plates. The reaction chambers are separated from one another by fixed radial walls 43, in order to avoid both a heat transfer or a moisture transfer between the sorbent of neighboring reactors and a mixing of the sorbent of neighboring reactors.

The flow cross sections of the openings in the end plates may be adapted in size and shape to the sector-shaped end face of a reactor chamber 20.1 to 20.12. However, the flow openings are advantageously designed to be larger than an axial end face of a reactor 20.1 to 20.12, so that a plurality of reactors connect the vents to one another as a flow connection. The rotor 61 is driven at a constant speed in a direction of rotation 66, with reactors being continuously available for adsorption and desorbed. A uniform cooling energy for air-conditioning of the cab is permanently available.

In order to avoid axial dropping out of the sorbent, each axial end face is covered by a coarse-meshed screen disc 67, which is preferably held on the walls 43.

Figure 9:
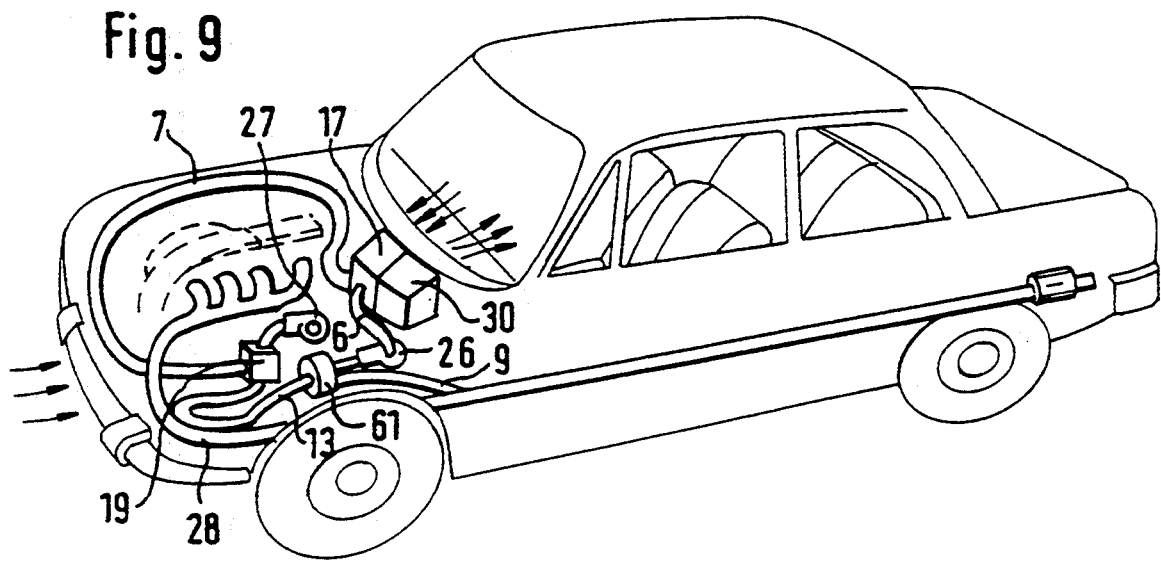
FIG. 9 shows diagrammatically the arrangement of a rotating sorption reactor in a motor vehicle.

In FIG. 9, the installation of a rotating sorption reactor according to FIG. 7 is represented diagrammatically. The heat exchanger 19 is arranged in the supply air duct 7, and is cooled by means of the blower 27. The blower 27 air stream is fed, after leaving the heat exchanger 19, directly to the exhaust gas heat exchanger 28 to then flow via the air-conducting duct 13 into the rotating sorption reactor.

In addition to having the reaction chambers 20.1 through 20.12 adjoin one another in the circumferential direction without any clearance, as illustrated in FIG. 8, it may be advantageous to arrange the reaction chambers in a honeycomb structure which consists of a zeolite in the rotor interior. In order to achieve a higher strength, the honeycomb structure may also consist of a metal coated with zeolite, similar to the platinum covering of the honeycomb of a motor vehicle exhaust-gas catalytic converter.

It will be apparent to those skilled in the art that various modifications and variations could be made without departing from the scope or spirit of the invention and it is intended that the present invention cover the modifications and variations provided that they come within the scope of the appended claims and their equivalents.

What is claimed is:

1. Apparatus for heating and/or cooling a motor vehicle passenger compartment, communicating with a supply air duct for supplying air to the compartment and an exhaust air duct for exhausting air from the compartment, comprising:

at least two sorption reactors provided with a sorbent, each of said reactors having a reaction chamber with opposing ends;

a first duct positioned at one end of said reaction chambers, through which first duct a first air stream passes from the exhaust air duct into a selected one of said reaction chambers for adsorbing moisture onto the sorbent and adding adsorption heat to the first air stream, and through which first duct a second air stream flows out of the selected other one of said reaction chambers; and a second duct positioned at the opposite end of each of said reaction chambers, through which second duct the second air stream passes into the selected other one of said reaction chambers for desorbing the moisture from the sorbent, and through which second duct the first air stream flows out of said selected one of said reaction chambers;

wherein the first and second air streams alternately flow through each of said reaction chambers such that while the first air stream in an adsorption phase is flowing through the first duct into the selected one of the reactors and then out of the second duct and is being fed via the supply air duct and a humidifying source into the compartment, the second air stream in a desorption phase is simultaneously flowing through the second duct into the selected other one of the reactors then out of the first duct and is desorbing the moisture from the sorbent, whereby desorption occurs in a direction of flow opposite the direction of flow of adsorption;

wherein each of said first ducts includes means for selectively controlling and guiding the first air stream from said exhaust air duct, through the selected one or the other of said first ducts and into the selected one or the other of said reaction chambers;

wherein each of said second ducts includes means for selectively controlling and guiding the second air stream from an air conducting duct, through the selected one or the other of said second ducts and into the selected one or the other of said reaction chambers;

wherein, for desorption, heat from an external source including one of waste heat from the motor that powers the motor vehicle and heat from a fuel burner supplied from a fuel tank of an engine is fed through a heat exchanger to a corresponding reaction chamber; and wherein a dry, heated adsorption air stream issuing from the reaction chamber during adsorption is fed to one of an air moistener to lower an air temperature by evaporative cooling and serve as a cooling air stream to cool the passenger compartment, and to the passenger compartment to raise an air temperature by heating a warm air stream fed to the passenger compartment.

2. The apparatus as claimed in claim 1, wherein said first ducts further include a first cross-duct for connecting therebetween, and said first duct controlling and guiding means comprise first and second air stream control elements positioned at points where said first cross-duct connects with said first ducts, and wherein said second ducts further include a second cross-duct for connecting therebetween, and said second duct controlling and guiding means comprise third and fourth air stream control elements positioned at points where said second cross-duct connects with said second ducts.

3. The apparatus as claimed in claim 2, wherein a vent air duct is connected to said first cross-duct through which vent air duct said second air stream passes from said first cross-duct.

4. The apparatus as claimed in claim 2, further comprising over-all switching control means for controlling the first and second duct controlling and guiding means, wherein the switching-over of the first and second air streams through the selected one or the other of said reactors is performed after the air temperature in the supply air duct drops below a predetermined minimum temperature.

5. Apparatus for heating and/or cooling a motor vehicle passenger compartment, communicating with a supply air duct for supplying air to the compartment and an exhaust air duct for exhausting air from the compartment, comprising:

at least two sorption reactors provided with a sorbent, each of said reactors having a reaction chamber with opposing ends;

a first duct positioned at one end of each of said reaction chambers, through which first duct a first air stream passes from the exhaust air duct into a selected one of said reaction chambers for adsorbing moisture onto the sorbent and adding adsorption heat to the first air stream, and through which first duct a second air stream flows out of the selected other one of said reaction chambers; and a second duct positioned at the opposite end of each of said reaction chambers, through which second duct the second air stream passes into the selected other one of said reaction chambers for desorbing the moisture from the sorbent, and through which second duct the first air stream flows out of said selected one of said reaction chambers;

wherein the first and second air streams alternately flow through each of said reaction chambers such that while the first air stream is flowing through the selected one of the reactors and being fed via the supply air duct and a humidifying source into the compartment, the second air stream is simultaneously flowing through the selected other one of the reactors and desorbing the moisture from the sorbent;

wherein each of said first ducts includes means for selectively controlling and guiding the first air stream from said exhaust air duct, through the selected one or the other of said first ducts and into the selected one or the other of said reaction chambers, and each of said second ducts includes means for selectively controlling and guiding the second air stream from an air conducting duct, through the selected one or the other of said second ducts and into the selected one or the other of said reaction chambers; and wherein said first ducts further include a first cross-duct for connecting therebetween, and said first duct controlling and guiding means comprise first and second air stream control elements positioned at points where said first cross-duct connects with said first ducts, and wherein said second ducts further include a second cross-duct for connecting therebetween, and said second duct controlling and guiding means comprise third and fourth air stream control elements positioned at points where said second cross-duct connects with said second ducts;

the apparatus further comprising over-all switching control means for controlling the first and second duct controlling and guiding means, wherein the switching-over of the first and second air streams through the selected one or the other of said reactors is performed after the moisture in the selected one of the reaction chambers reaches a predetermined moisture level.

6. Apparatus for heating and/or cooling a motor vehicle passenger compartment, communicating with a supply air duct for supplying air to the compartment and an exhaust air duct for exhausting air from the compartment, comprising:

at least two sorption reactors provided with a sorbent, each of said reactors having a reaction chamber with opposing ends;

a first duct positioned at one end of each of said reaction chambers, through which first duct a first air stream passes from the exhaust air duct into a selected one of said reaction chambers for adsorbing moisture onto the sorbent and adding adsorption heat to the first air stream, and through which first duct a second air stream flows out of the selected other one of said reaction chambers; and a second duct positioned at the opposite end of each of said reaction chambers, through which second duct the second air stream passes into the selected other one of said reaction chambers for desorbing the moisture from the sorbent, and through which second duct the first air stream flows out of said selected one of said reaction chambers;

wherein the first and second air streams alternately flow through each of said reaction chambers such that while the first air stream is flowing through the selected one of the reactors and being fed via the supply air duct and a humidifying source into the compartment, the second air stream is simultaneously flowing through the selected other one of the reactors and desorbing the moisture from the sorbent;

wherein each of said first ducts includes means for selectively controlling and guiding the first air stream from said exhaust air duct, through the selected one or the other of said first ducts and into the selected one or the other of said reaction chambers, and each of said second ducts includes means for selectively controlling and guiding the second air stream from an air conducting duct, through the selected one or the other of said second ducts and into the selected one or the other of said reaction chambers; and wherein the supply air duct includes a heat exchanger, through which a cooling air is made to flow and mix with said first air stream.

7. The apparatus as claimed in claim 1, wherein the humidifying source comprises at least one evaporator, arranged in the interior of the compartment.

8. Apparatus for heating and/or cooling a motor vehicle passenger compartment, communicating with a supply air duct for supplying air to the compartment and an exhaust air duct for exhausting air from the compartment, comprising:

at least two sorption reactors provided with a sorbent, each of said reactors having a reaction chamber with opposing ends;

a first duct positioned at one end of each of said reaction chambers, through which first duct a first air stream passes from the exhaust air duct into a selected one of said reaction chambers for adsorbing moisture onto the sorbent and adding adsorption heat to the first air stream, and through which first duct a second air stream flows out of the selected other one of said reaction chambers; and a second duct positioned at the opposite end of each of said reaction chambers, through which second duct the second air stream passes into the selected other one of said reaction chambers for desorbing the moisture from the sorbent, and through which second duct the first air stream flows out of said selected one of said reaction chambers;

wherein the first and second air streams alternately flow through each of said reaction chambers such that while the first air stream is flowing through the selected one of the reactors and being fed via the supply air duct and a humidifying source into the compartment, the second air stream is simultaneously flowing through the selected other one of the reactors and desorbing the moisture from the sorbent;

wherein each of said first ducts includes means for selectively controlling and guiding the first air stream from said exhaust air duct, through the selected one or the other of said first ducts and into the selected one or the other of said reaction chambers, and each of said second ducts includes means for selectively controlling and guiding the second air stream from an air conducting duct, through the selected one or the other of said second ducts and into the selected one or the other of said reaction chambers; and wherein the second air stream is an air stream heated by exhaust gas of the motor vehicle.

9. The apparatus as claimed in claim 1, wherein at least in the selected one of the reaction chambers in which adsorption takes place, a cooling air stream flows through said selected one of the reaction chambers in a heat exchanging manner such that a temperature reduction of the sorbent occurs before commencement of adsorption.

10. Apparatus for heating and/or cooling a motor vehicle passenger compartment, communicating with a supply air duct for supplying air to the compartment and an exhaust air duct for exhausting air from the compartment, comprising:

at least two sorption reactors provided with a sorbent, each of said reactors having a reaction chamber with opposing ends;

a first duct positioned at one end of each of said reaction chambers, through which first duct a first air stream passes from the exhaust air duct into a selected one of said reaction chambers for adsorbing moisture onto the sorbent and adding adsorption heat to the first air stream, and through which first duct a second air stream flows out of the selected other one of said reaction chambers; and a second duct positioned at the opposite end of each of said reaction chambers, through which second duct the second air stream passes into the selected other one of said reaction chambers for desorbing the moisture from the sorbent, and through which second duct the first air stream flows out of said selected one of said reaction chambers;

wherein the first and second air streams alternately flow through each of said reaction chambers such that while the first air stream is flowing through the selected one of the reactors and being fed via the supply air duct and a humidifying source into the compartment, the second air stream is simultaneously flowing through the selected other one of the reactors and desorbing the moisture from the sorbent;

wherein each of said first ducts includes means for selectively controlling and guiding the first air stream from said exhaust air duct, through the selected one or the other of said first ducts and into the selected one or the other of said reaction chambers, and each of said second ducts includes means for selectively controlling and guiding the second air stream from an air conducting duct, through the selected one or the other of said second ducts and into the selected one or the other of said reaction chambers; and wherein in each reaction chamber there is arranged an internal heat exchanger having primary and secondary sides, said heat exchanger being connected on said primary side to a common external heat exchanger, said common external heat exchanger also having primary and secondary sides.

11. The apparatus as claimed in claim 10, wherein the internal heat exchangers of the reaction chambers are connected in parallel on the primary side, and can be alternately connected via valves to the primary side of the common heat exchanger.

12. The apparatus as claimed in claim 10, wherein the secondary side of the external heat exchanger is impinged by a heated air stream, and the internal heat exchanger of each reaction chamber is connected to the common external heat exchanger, through which the second air stream flows.

13. The apparatus as claimed in claim 10, wherein a cooling air stream flows through the secondary side of the external heat exchanger and the internal heat exchanger of each reaction chamber is connected to the external heat exchanger, through which the first air stream flows.

14. The apparatus as claimed in claim 10, wherein an additional external heat exchanger is provided, which can be connected via changeover valves alternately to the one or the other internal heat exchanger.

15. The apparatus as claimed in claim 11, wherein an additional external heat exchanger is provided, which can be connected via changeover valves alternately to the one or the other internal heat exchanger.

16. Apparatus for heating and/or cooling a cab, for example a motor vehicle passenger compartment, communicating with a supply air duct for supplying air to the compartment and an exhaust air duct for exhausting air from the compartment, comprising:
  at least two sorption reactors provided with a sorbent, each of said reactors having a reaction chamber with opposing ends;
  a first duct positioned at one end of each of said reaction chambers, through which first duct a first air stream passes from the exhaust air duct into a selected one of said reaction chambers for adsorbing moisture onto the sorbent and adding adsorption heat to the first air stream, and through which first duct a second air stream flows out of the selected other one of said reaction chambers; and
  a second duct positioned at the opposite end of each of said reaction chambers, through which second duct the second air stream passes into the selected other one of said reaction chambers for desorbing the moisture from the sorbent, and through which second duct the first air stream flows out of said selected one of said reaction chambers;
  wherein the first and second air streams alternately flow through each of said reaction chambers such that while the first air stream is flowing through the selected one of the reactors and being fed via the supply air duct and a humidifying source into the compartment, the second air stream is simultaneously flowing through the selected other one of the reactors and desorbing the moisture from the sorbent; and
  wherein the reactors form a drum-shaped rotor and their reaction chambers are flowed through in the axial direction of the rotor, the reaction chambers being closed at both axial ends of the rotor by end plates which are fixed to the rotor housing, and wherein said first ducts are first flow openings and said second ducts are second flow openings in the end plates, said first and second flow openings extending over a partial circumference of the end plate, for the first and the second air streams.

17. The apparatus as claimed in claim 16, wherein the axial end face of the reactor chamber corresponds to a partial annular surface of the rotor housing.

18. The apparatus as claimed in claim 17, wherein the partial annular surface of the first or second flow opening arranged in an end plate is congruent with the partial annular surface of a reactor chamber end face.

19. The apparatus as claimed in claim 17, wherein the partial annular surface of the first or second flow opening is greater than an axial end face of a reaction chamber.

20. The apparatus as claimed in claim 16, wherein a multiplicity of reactors are arranged in the rotor.

21. The apparatus as claimed in claim 16, wherein the reaction chambers adjoin each other in the circumferential direction of the rotor without any clearance.

22. The apparatus as claimed in claim 16, wherein the first flow opening and a second flow opening are arranged in each end plate.

23. The apparatus as claimed in claim 16, wherein the rotor rotates at a constant speed.

* * * * *